United States Patent
Yang et al.

(10) Patent No.: US 8,005,492 B2
(45) Date of Patent: Aug. 23, 2011

(54) SENDING QUICK PAGING MESSAGES AND REGULAR PAGING MESSAGES IN A WIRELESS COMMUNICATIONS SYSTEM

(75) Inventors: Yunsong Yang, San Diego, CA (US); Quanzhong Gao, San Diego, CA (US); Mingxia Xu, Shenzhen (CN)

(73) Assignee: FutureWei Technologies, Inc., Plano, TX (US)

( * ) Notice: Subject to any disclaimer, the term of this patent is extended or adjusted under 35 U.S.C. 154(b) by 825 days.

(21) Appl. No.: 11/852,555

(22) Filed: Sep. 10, 2007

(65) Prior Publication Data
US 2008/0081613 A1   Apr. 3, 2008

Related U.S. Application Data

(60) Provisional application No. 60/828,069, filed on Oct. 3, 2006.

(51) Int. Cl.
*H04W 68/00* (2009.01)
(52) U.S. Cl. .......... 455/458; 455/422.1; 455/426.1; 455/460; 370/259
(58) Field of Classification Search .......... 455/458, 455/422.1, 426.1, 515, 460; 340/7.1–7.63; 370/259
See application file for complete search history.

(56) References Cited

U.S. PATENT DOCUMENTS

| | | | |
|---|---|---|---|
| 2005/0064880 A1* | 3/2005 | Butler et al. | 455/458 |
| 2006/0285485 A1* | 12/2006 | Agrawal et al. | 370/208 |
| 2007/0015523 A1 | 1/2007 | Prakash et al. | |

OTHER PUBLICATIONS

Willey, D., "Proposed QPCH Structure Using Variable Number of PIs per Page," 3rd Generation Partnership Project 2, Conference Call 3GPP2-C21-20060823, Aug. 2006, pp. 1-8, 3GGP2.
Qualcomm Incorporated, "UHDR-One: MAC Layer Overhead Channels," 3rd Generation Partnership Project 2, Aug. 25, 2006, pp. 1-17.
"Medium Access Control Layer for Ultra Mobiile Broadband (UMB) Air Interface Specification," 3rd Generation Partnership Project 2, 3GPP2 C.S0084-002-0, Version 1.6, May 2007, pp. i-8-48, 3GGP2.
Harris, J., et al. "Paging Compression," 3rd Generation Partnership Project 2, RIM, MOT, pp. 1-8, Sep. 6, 2006, 3GGP2.
Harris, J., et al. "Quick Paging Optimization & Perfomance Analysis," 3rd Generation Partnership Project 2, pp. 1-19, MOT, RIM, Huawei, RITT, ZTE, BELL, U.S.C, Oct. 11, 2006, 3GGP2.
Harris, J., et al. "Quick Paging Optimization & Perfomance Analysis," 3rd Generation Partnership Project 2, pp. 1-10, Sep. 11, 2006, MOT, RIM, Huawei, ZTE, 3GGP2.

* cited by examiner

*Primary Examiner* — Kamran Afshar
*Assistant Examiner* — Sayed T Zewari
(74) *Attorney, Agent, or Firm* — Slater & Matsil, L.L.P.

(57) ABSTRACT

Sending quick paging or regular paging messages is disclosed. The format of the quick paging or regular paging message is compressed in a systematic way without losing any information. Additional bits can be embedded in and extracted from the comparison between each pair of remaining partial numbers that are not compressed further.

30 Claims, 7 Drawing Sheets

FIG. 1
(PRIOR ART)

| # OF PAGES | | | | | | | HEADER AND MESSAGE CONTENT FORMAT | | | | | |
|---|---|---|---|---|---|---|---|---|---|---|---|---|
| 1 | 0 | 0 | 0 | 0 | 0 | 0 | 29 MSBs OF SESSION SEED | | | | | |
| 2 | 0 | 0 | 0 | 0 | 0 | 1 | 14 MSBs | | 14 MSBs | | | 1 |
| 3 | 0 | 0 | 0 | 0 | 1 | | 10 MSBs | 10 MSBs | | 10 MSBs | | 1 1 |
| 4 | 0 | 0 | 0 | 1 | | | 7 MSBs | 7 MSBs | 7 MSBs | 7 MSBs | | 1 1 1 1 |
| 5 | 0 | 0 | 1 | 0 | | | 6 MSBs | 6 MSBs | 6 MSBs | 5 MSBs | 5 MSBs | 1 1 1 1 |
|   | 0 | 0 | 1 | 1 | | | 5 MSBs | 5 MSBs | 6 MSBs | 6 MSBs | 6 MSBs | 1 1 1 1 1 |
| 6 | 0 | 1 | 0 | 0 | | | 6 MSBs | 6 MSBs | 6 MSBs | 6 MSBs | 5 MSBs (2 ATs) | 1 1 1 1 1 |
|   | 0 | 1 | 0 | 1 | | | 6 MSBs | 6 MSBs | 6 MSBs | 6 MSBs | 6 MSBs (2 ATs) | 1 1 1 1 1 |
| 7 | 0 | 1 | 1 | 0 | | | 5 MSBs | 5 MSBs | 5 MSBs | 5 MSBs | 3 MSBs (3 ATs) | 5 MSBs (2 ATs) | 1 1 1 1 1 1 |
|   | 0 | 1 | 1 | 1 | | | 5 MSBs | 5 MSBs | 5 MSBs | 5 MSBs | 4 MSBs (3 ATs) | 6 MSBs (2 ATs) | 1 1 1 1 1 1 |
| >7 | 1 | 0 | 1 | | | | 32 BITS FOR PLs (3 PLs PER AT) | | | | | |
|   | 1 | 1 | 0 | | | | 32 BITS FOR PLs (2 PLs PER AT) | | | | | |
|   | 1 | 1 | 1 | | | | 32 BITS FOR PLs (1 PLs PER AT) | | | | | |

| # OF PAGES | PAGE RECORD FORMAT | | | | | | | |
|---|---|---|---|---|---|---|---|---|
| | 200 | 201 | 202 | 203 | 204 | | | |
| 1-4 | HEADER | 32 | 32 | 32 | 32 | | | |
| 5 | HEADER | 26 | 26 | 26 | 25 | 25 | | |
| 6 | HEADER | 22 | 22 | 21 | 21 | 21 | 21 | |
| 7 | HEADER | 19 | 19 | 18 | 18 | 18 | 18 | 18 |
| 8 | HEADER | 16 | 16 | 16 | 16 | 16 | 16 | 16 | 16 |

| # OF PAGES | PAGE RECORD FORMAT | | | |
|---|---|---|---|---|
| 1-4 | 32 (600) | 32 (601) | 32 (602) | 32 (603) |
| 5 | 24 (605) | 24 (606) | 2 (604) 25 (608) | 25 (609) 1 (607) 27 |
| 6 | 20 (610) | 20 (611) | 2 (612) 21 (613) | 21 1 (614) 21 22 (615) |
| 7 | 17 (616) | 17 (617) | 2 (618) 17 17 (619) | 2 18 (620) 18 1 (621) 19 |
| 8 | 15 | 15 | 2 15 15 | 2 15 16 1 16 16 |

SENDING QUICK PAGING MESSAGES AND REGULAR PAGING MESSAGES IN A WIRELESS COMMUNICATIONS SYSTEM

This application claims the benefit of U.S. Provisional Application No. 60/828,069, filed on Oct. 3, 2006, entitled "Method for Sending Quick Paging Messages and Regular Paging Messages in a Wireless Communication System," which application is hereby incorporated herein by reference.

TECHNICAL FIELD

The present invention relates, in general, to a wireless communications system, and, more particularly, to sending quick paging messages and regular paging messages in a wireless communications system.

BACKGROUND

A wireless communications system uses paging messages on the paging channel or traffic channel to notify the access terminal (AT), also known as mobile station (MS), of incoming voice or data calls and to send other control information. To conserve power consumption, idle ATs wake up periodically during the assigned time slots to monitor the paging messages. In various evolutions of the third generation (3G) wireless communications system, a regular paging message is transmitted on the shared traffic channel with hybrid automatic repeat request (HARQ). Therefore, it may take a few interlaced frames for the ATs to correctly decode the regular paging message, which prolongs the wake-up time for idle AT, and shortens the standby battery time. To further conserve the power consumption, a quick paging channel (QPCH) is used to indicate if there is a regular paging message intended for an AT in the up-coming pre-assigned time slot. The use of a QPCH improves the battery life by enabling the idle ATs to avoid monitoring for a regular paging message if there is no regular paging message intended for this AT. Less power is required to monitor the QPCH than is required to monitor for a regular paging message.

False wake-up can occur causing the AT to monitor for a regular paging message when there is no regular paging message intended for this AT. The optimum design of the QPCH minimizes the false wake-up probability, thus, maximizing the battery life at the AT.

Figure 1:
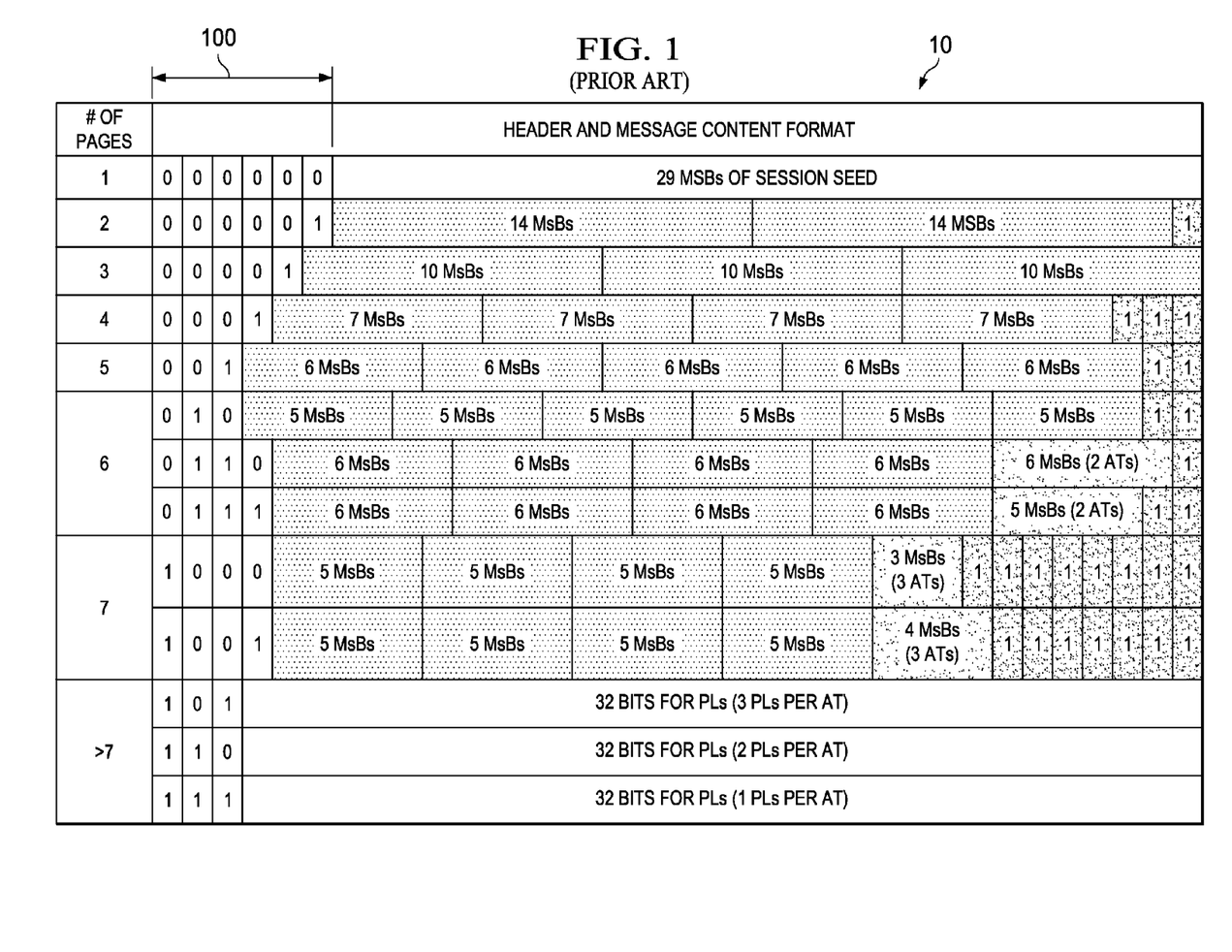
FIG. 1 illustrates an existing method for sending a quick paging message design.

FIG. 1 illustrates a published proposal for quick paging message 10 designed for the air interface evolution (AIE) of cdma2000 technology, as documented as the Third Generation Partnership Project 2 (3GPP2) standard contribution C21-20060911-016. According to FIG. 1, header 100 in the quick paging message has a variable length and indicates the message format. If the number of ATs being quick-paged is larger than seven, a bitmap with variable times of hashing is used, while if the number of ATs being quick-paged is smaller than or equal to seven, the quick paging message is divided into header 100 and one or more quick page identifier (QPID) fields, each QPID field contains a certain number of the most significant bits (MSBs) of an AT's session seed. An idle AT will monitor the next regular paging message if it sees that the MSBs of its session seed match one of the QPIDs in the quick paging message.

According to the aforementioned published proposal, the numerical relationship among these QPID numbers in the sequence that they appear in the quick paging message is called the ordering pattern. Additional bits of the session seeds of the paged ATs, which are called ordering bits, can be indicated through implication by the ordering pattern and are evenly distributed among all paged ATs to increase the effective length of the QPID fields, thus, reducing the false wake-up rate. A method of bit-compression is also used for circumstances in which there are six or seven ATs paged, where, if the MSBs of two AT's session seeds match each other to a certain length, the part that matches can be indicated only once to allow additional bits to be evenly distributed among all QPID fields. This further increases the effective length of the QPID fields.

In order to transmit the ordering bits, the transmitter sorts out the ordering pattern by the numerical relationship among the partial QPIDs that are explicitly indicated in the QPID fields. It then uses a look-up table, and those additional session seed bits that are to be implicitly indicated by the ordering pattern, to determine the sequence by which the explicitly indicated partial QPIDs should be transmitted. The receiver, after receiving the quick paging message, also sorts out the ordering pattern by the numerical relationship among the explicitly indicated partial QPIDs. It then uses a look-up table to determine the values of those additional session seed bits that are implicitly indicated by the ordering pattern. The receiver forms each complete QPID by padding the additional session seed bit to the corresponding explicitly indicated partial QPID. Using this determined QPID, the receiver determines if it is being quick-paged by matching the MSBs of its session seed with each complete QPID. As the number of quick-paged ATs increases, the complexity associated with sorting the numbers and searching the look-up tables increases exponentially. Therefore, it becomes costly to implement such a method when the number of quick-paged ATs is larger than four or five.

The aforementioned published proposal claims to be able to extract the maximal number of ordering bits that is theoretically allowed. However, the maximal number of ordering bits can be embedded in and extracted from the ordering pattern only if all explicitly indicated partial QPIDs in the QPID fields are unique. When some explicitly indicated partial QPIDs are the same, the number of ordering bits that can be embedded in and extracted from the ordering pattern is significantly reduced. Additional look-up tables are to be provided in this case. Moreover, certain combinations of explicitly indicated partial QPIDs and additional ordering bits may not be accommodated by the transmitter, or else errors will occur at the receiver. For example, in the case with three paged ATs, A, B, and C represent three partial QPIDs that can be explicitly indicated in the QPID fields. If B=C, there are only three ordering patterns that the receiver can differentiate, namely ABB, BAB, and BBA, using B to replace C since B=C. The other ordering patterns cannot be allowed at the transmitter, or the receiver will decode the ordering bits incorrectly.

Figure 2:
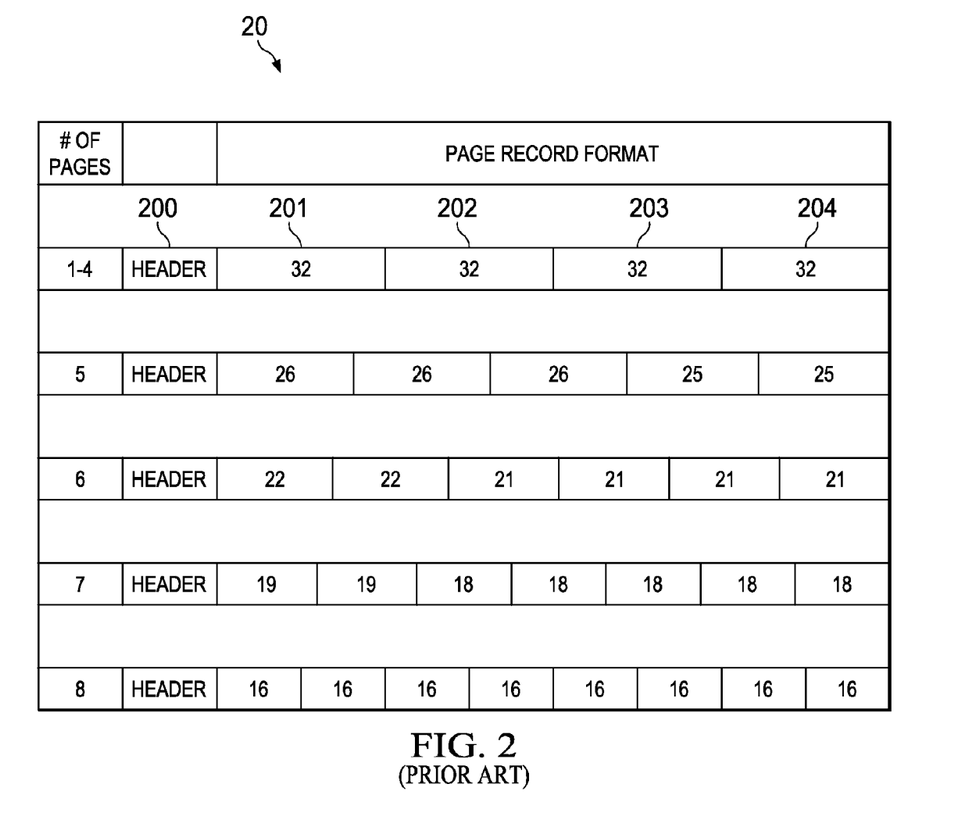
FIG. 2 illustrates an existing method for sending a regular paging message design.

FIG. 2 illustrates another proposal for regular paging message 20 designed for the air interface evolution (AIE) of cdma2000 technology, as documented as 3GPP2 standard contribution C21-20060911-024. According to FIG. 2, a page record is used to address multiple ATs via a single regular paging message. Header 200 of the page record indicates how many ATs are being paged by the regular paging message. When paging one to four ATs, up to four 32-bit access terminal identifier (ATI) addresses 201-204 may be included in the record. When paging N ATs using one page record, where N is an integer greater than four and less than nine, the 128-bit page record is divided into N x-bit partial addresses for N ATs being paged, where x is approximately equal to [128/N]. Each partial address is based on certain numbers of the least significant bits (LSBs) of the AT's session seed. Additional session seed bits can be implied from the ordering pattern of the explicitly indicated partial addresses relative to the sequence that these explicitly indicated partial addresses appear in the page record, similar to the ordering bits in the quick paging method as described above and in FIG. 1. Again, the complexity of realizing the performance gain from the full ordering bits is high at both the transmitters and the receivers.

SUMMARY OF THE INVENTION

Representative embodiments of the present invention provide a quick paging method that reduces the false wake-up rate for the idle ATs and has a low complexity for implementation.

Additional representative embodiments of the present invention provide a regular paging method that reduces the false addressing rate for the idle ATs that are not being paged and the method has a low complexity for implementation.

In accordance with one aspect of the present invention, an improved method for sending the quick paging message or the regular paging message is disclosed. The method includes determining the number of quick-paged or regularly-paged ATs N, selecting the message format based on the number N, searching for all the guaranteed matched bits among N numbers that represent the N ATs, compressing the matched bits according to the message format selected, placing the remaining partial numbers without the matched bits in the message according to the message format selected, placing the unmatched numbers in the message according to the message format selected, and transmitting the message with the corresponding header.

In accordance with another aspect of the present invention, an improved method for embedding and extracting additional QPID bits in the quick paging message or additional address bits in the regular paging message is disclosed. The method includes embedding additional information bits by the comparison between two partial numbers or two unmatched numbers by the transmitter, distributing the additional information bits evenly among the paged ATs by the transmitter, extracting the additional information bits by the comparison between two partial numbers or two unmatched numbers by the receiver, reconstructing the complete paged numbers including the embedded additional bits by the receiver, and determining if the AT has been paged by the receiver.

One benefit of the various embodiments of the present invention is that the message overhead can be reduced without reducing the amount of information that is transmitted in the quick page and/or regular page messages.

Another benefit is that, if the same message overhead is used, more information can be included in these paging messages.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The present invention provides a method for sending the quick paging messages and the regular paging messages in a wireless communications system. It is understood, however, that the following disclosure provides many different embodiments, or examples, for implementing different features of the invention. Specific examples of components, signals, messages, protocols, and arrangements are described below to simplify the present disclosure. These are, of course, merely examples and are not intended to limit the invention from that described in the claims. Well known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding control circuitry described herein are omitted, as such control circuits are within the skills of persons of ordinary skill in the relevant art.

In the following sections, certain numbers of the session seed MSBs of the AT are used as the QPID in the quick paging message. However, it is possible to use other numbers associated with the AT as the QPID. For example, certain numbers of the session seed LSBs of the ATs, certain numbers of the MSBs or the LSBs of a hashed number with the AT's unicast ATI (UATI), Electronic Serial Number (ESN), MIN (Mobile Identification Number), or International Mobile Station Identification (IMSI), and the like, may be used. It should be noted that the possible associated numbers that can be used are not limited to those identified herein.

Figure 3:
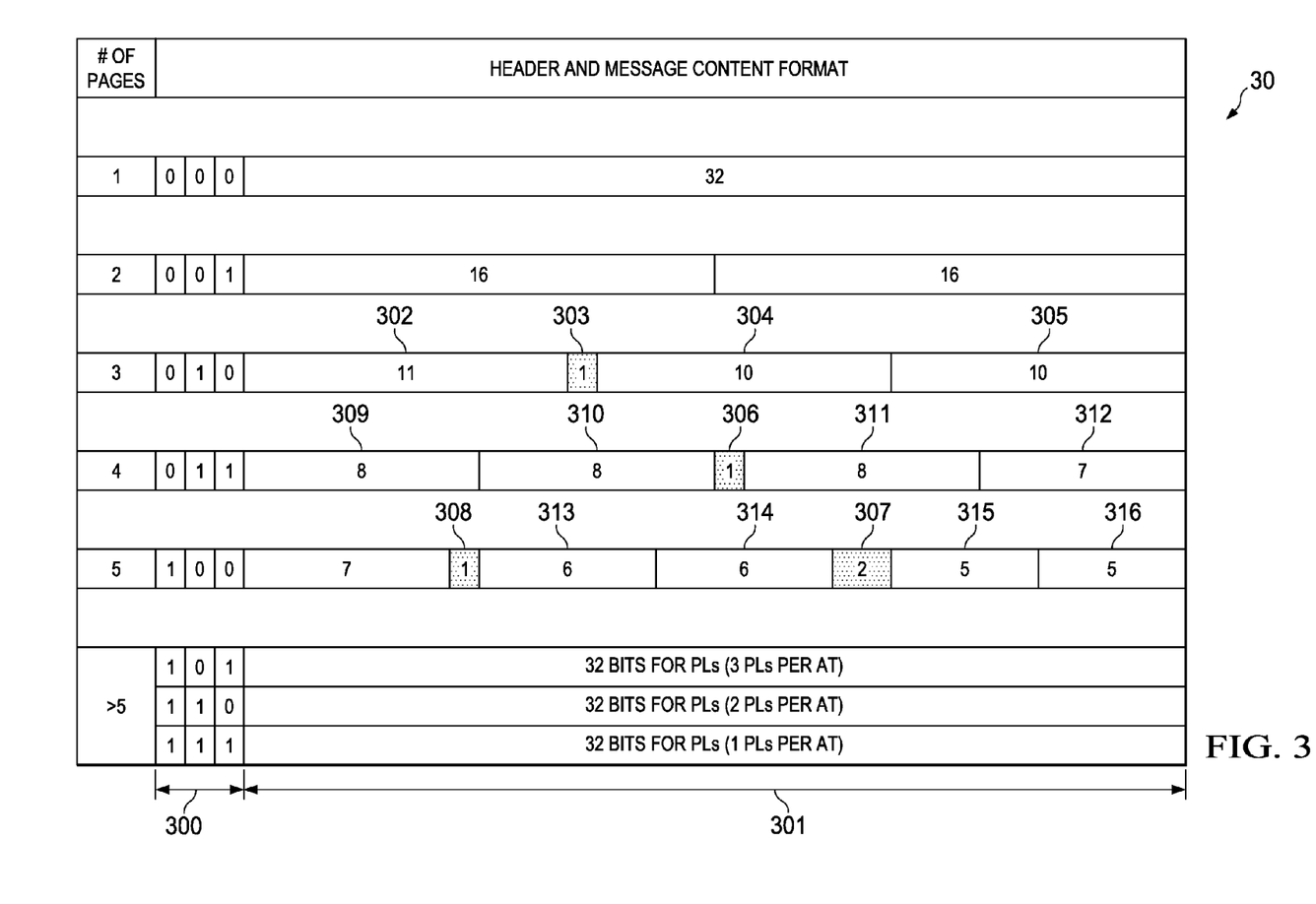
FIG. 3 illustrates an exemplary embodiment of an improved method for sending the quick paging messages according to the present invention.

FIG. 3 illustrates the exemplary embodiment of an improved method for sending quick paging message 30 according to one aspect of the present invention. As shown in FIG. 3, 3-bit header 300 indicates the format of quick paging message 30. The numbers in the header field indicate the values of the header bits for each number of paged ATs. The numbers in fields 301, that follow header field 300, indicate the number of bits in each field. When quick-paging three ATs, it is guaranteed that at least two ATs will have session seeds sharing the same first MSB, because, if the first MSBs of the first two ATs' session seeds are different, i.e. they are "0" and "1," respectively, the first MSB of the third AT's session seed is equal to one of them. Therefore, it is not needed to repeat the first MSB of the third AT's session seed.

Although it is also true that for any bit in the session seed, two out of three ATs' session seeds will match on that particular bit, it is more convenient to start the matching from the very most significant bit, if the MSBs of the AT's session seed are used in the quick paging message. If the LSBs of the AT's session seed are used in the quick paging message, then it is more convenient to start the matching from the very LSB bit.

As shown in FIG. 3, when quick-paging three ATs, 11-bit field 302 that follows 3-bit header 300 is used to indicate 11 MSBs of the first AT's session seed as its explicit QPID. The second and third ATs share the same first MSBs in their session seeds. The first AT may or may not share the same first MSB with the second and third ATs. 1-bit field 303 that follows 11-bit field 302 indicates the common first MSB that the second and third ATs share. The next 20 bits that follows 1-bit common first MSB field 303 are divided into two 10-bit fields 304-305, which are used to indicate the second to the 11th MSBs of the second and third ATs' session seeds as their partial QPIDs, respectively.

Similarly, when quick-paging four ATs, it is guaranteed that at least two ATs' session seeds have the same first MSB. Therefore, the two common first MSBs of these two ATs are compressed into 1-bit field 306, as shown in FIG. 3. When quick-paging five ATs, it is guaranteed that at least two out of five ATs' session seeds have the same first two MSBs, and for the remaining three ATs, it also is guaranteed that at least two ATs' session seeds have the same first MSB. Therefore, the two common first two MSBs are compressed into 2-bit field 307, and the two common first MSBs are compressed into 1-bit field 308.

It should be noted that when the MSBs of the AT's session seeds are used in the quick paging message, it is preferred to have each common MSB field lead in front of the two associated partial QPIDs fields. When the LSBs of the AT's session seeds are used in the quick paging message, it is preferred to have each common LSB field lag behind the two associated partial QPIDs fields. However, other arrangements are also possible, for example, all common bits fields can be in the front followed by the partial QPID fields, or all partial QPID fields can be in the front followed by the common bits fields.

According to another aspect of the present invention, the transmitter first determines the number of quick-paged ATs. Then, based on the number of quick-paged ATs, the transmitter selects the message format and determines the number of minimal matches and the number of bits for each match that the transmitter is to identify. The minimal matches are the least amount of matched binary bits that are guaranteed given a number of ATs paged. This calculation is based on the principle that two out of any three binary numbers have one binary bit matched, two out of any five binary numbers have two binary bits matched (two out of the remaining three binary numbers also have one binary bit matched), two out of any nine binary numbers have three binary bits matched, and so on. Thereafter, the transmitter starts to search for these minimal matches, beginning from the match that has the largest number of matched bits before searching for the match that has the second largest number of matched bits, and so on.

Figure 4:
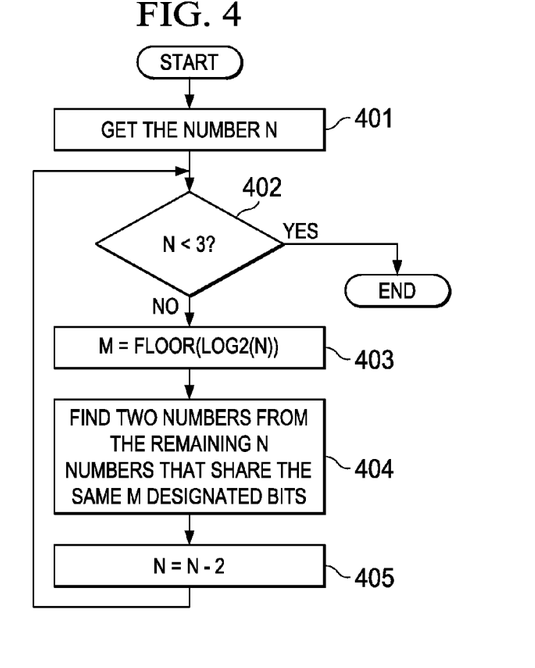
FIG. 4 illustrates a generalized method for a transmitter to search for minimal guaranteed matches and to determine the number of matched bits for each match among N numbers according to the present invention.

FIG. 4 illustrates example steps executed to implement a generalized method for the transmitter to search for the minimal guaranteed, according to another embodiment of the present invention. The transmitter first receives N numbers in step 401. In step 402, the transmitter determines if N is less than three. If not, the transmitter computes the number of matches according to the formula: $M=\text{floor}(\log_2(N))$, in step 403, where floor( ) represents the function of rounding towards minus infinity and $\log_2$( ) represents the function of logarithm with a base of 2. In step 404, the transmitter searches two out of N numbers that share the same M designated bits. The designated bits can be the MSBs, the LSBs, or other pre-defined bits of the numbers. In step 405, the transmitter updates N=N−2, which also means forming a pool of the remaining numbers for the next round of searching without the two numbers between which a match is already found in step 404, and then returns to step 402 to determine if the updated N is less than 3. The transmitter repeats the loop of steps 402-405 until it determines that the updated N is less than three, in step 402, when it ends the search.

Generally, if N is an even number, i.e., if N=2k, where k is an integer, there will be (k−1) common-bit fields, 2(k−1) partial number fields and two unmatched number fields in the compressed message that corresponds to N paged ATs. If N is an odd number, i.e., if N=2k+1, where k is an integer, there will be (k−1) common-bit fields, 2(k−1) partial number fields and one unmatched number field in the compressed message that corresponds to N paged ATs.

The transmitter places the MSBs of the paged ATs' session seeds according to the result of the search and the message format that corresponds to the number of quick-paged ATs. For example, referring again to FIG. 3, when quick-paging three ATs, the transmitter first determines if the first and second ATs share the same first MSB in their session seeds or not. If yes, the transmitter places the 11 MSBs of the third AT in 11-bit field 302, places the common first MSB of session seed that the first and second ATs share in 1-bit field 303, and places the second to the 11th MSBs of the first and second ATs' session seeds in first and second 10-bit fields 304-305, respectively. If the first and second ATs do not share the same first MSB in their session seeds, the transmitter then determines if the first and third ATs share the same first MSB in their session seeds or not. If yes, the transmitter places the 11 MSBs of the second AT in 11-bit field 302 instead, places the common first MSB of session seed that the first and third ATs share in 1-bit field 303, and places the second to the 11th MSBs of the first and third ATs' session seeds in first and second 10-bit fields 304-305, respectively. If the first and third ATs do not share the same first MSB in their session seeds, the second and third ATs share the same first MSB in their session seeds. The transmitter then places the 11 MSBs of the first AT in 11-bit field 302, puts the common first MSB of session seed that the second and third ATs share in 1-bit field 303, and puts the second to the 11th MSBs of the second and third ATs' session seeds in first and second 10-bit fields 304-305, respectively. The transmitter then transmits quick paging message 30 with the header "010" that corresponds to the 3 quick-paged ATs case.

According to yet another aspect of the present invention, after decoding the quick paging message correctly, i.e., the cyclic redundancy check (CRC) checks out correctly, the receiver reads the header first. Based on header 300, the receiver selects the message format and decompresses the QPID fields if necessary, to reconstruct all of the QPID fields accordingly. Next, the receiver compares each QPID with the MSBs of its session seed. If there is a match, the AT is being quick-paged and the AT will monitor the next regular paging message. If there is no match, the AT is not being quick-paged and the idle AT can return to power saving mode until the next quick paging message.

According to yet another aspect of the present invention, the method of compression, as shown in FIG. 3 and described above, simplifies the ordering patterns. For example, when quick-paging three ATs, the number in 11-bit field 302 cannot participate the ordering, as its position is fixed. The comparison between the two 10-bit explicitly indicated partial QPIDs in fields 304-305, may be used to indicate an additional ordering bit, for example, to be added to 11-bit field 302 as the 12th MSB of the first AT's session seed that appears in quick paging message 30. To be more specific, if the 12th MSB of the first session seed that partially appears in the quick message is "0", the first 10-bit explicitly indicated partial QPID should be smaller than the second 10-bit explicitly indicated partial QPID in the same quick paging message. Otherwise, the first 10-bit explicitly indicated partial QPID should be larger than the second 10-bit explicitly indicated partial QPID. The receiver should set the 12th MSB of the first session seed that partially appears in the quick message to "0" if the first 10-bit explicitly indicated partial QPID is smaller than the second 10-bit explicitly indicated partial QPID in the same quick paging message. Otherwise, the receiver should set the 12th MSB of the first session seed that appears in the quick message to "1".

Unlike the existing ordering method, where the complete sorting and complex look-up procedure are needed at both the transmitter and receiver, the improved method of the described embodiments allow the embedding and extracting of each additional ordering bit by using only the comparison between two numbers, without any additional logic operations or look-up tables, thereby significantly reducing the implementation complexity.

Similarly, when quick-paging four ATs, two ordering bits can be embedded in and extracted from the comparison between first and second 8-bit fields 309-310, and the comparison between the first 7-bits in third 8-bit field 311 and 7-bit field 312, respectively, according to the message format corresponding to the case of four quick-paged ATs. When quick-paging five ATs, two ordering bits can be embedded in and extracted from the comparison between first and second 6-bit fields 313-314, and the comparison between first and second 5-bit fields 315-316, respectively, according to the message format corresponding to the case of five quick-paged ATs.

Figure 5:
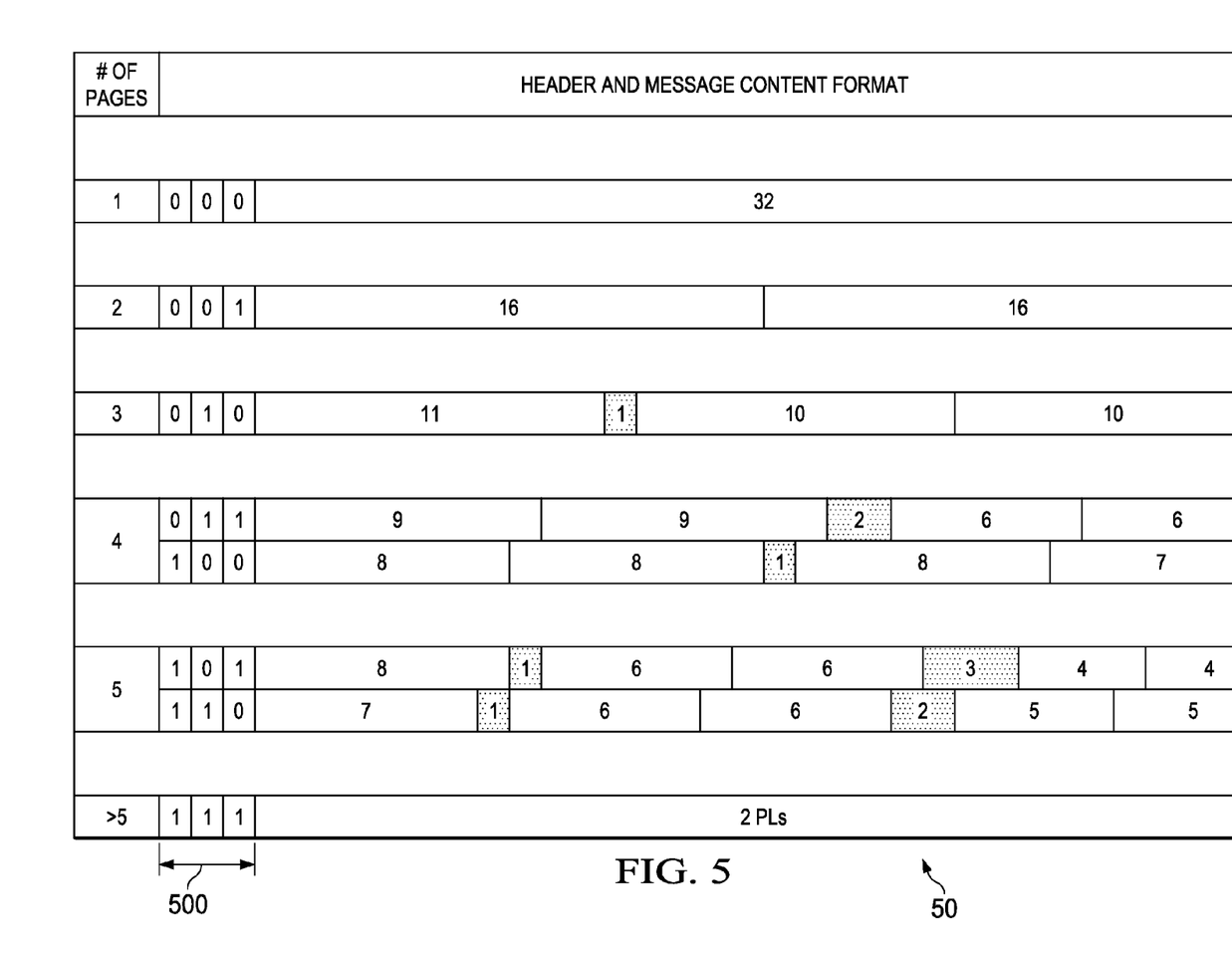
FIG. 5 illustrates an alternative embodiment of the improved method for sending quick paging messages according to the present invention.

FIG. 5 illustrates an alternative embodiment of the improved method for sending quick paging message 50 according to one embodiment of the present invention. The difference between the examples shown in FIG. 3 and FIG. 5 is that in FIG. 3, when quick-paging three, four, or five ATs, it is guaranteed that the message format corresponding to three, four, or five ATs may be used, while in FIG. 5, an additional message format is added for each case of quick-paging four or five ATs, with header 500 bits of "011" for quick-paging four ATs, and "101" for quick-paging five ATs. These additional formats in FIG. 5 are highly likely to be used (thereby referred as the highly-likely message format), because the probability that the first two MSBs of two out of four ATs' session seeds match is about 90%, and the probability that the first three MSBs of two out of five ATs' session seeds match is about 80%. For the other 10% or 20% of the time, where these additional message formats will not be used, the transmitter uses the original formats that are associated with the header bits of "100" for paging four ATs, or "110" for paging five ATs.

In this case, if a highly-likely message format exists for a given number of quick-paged ATs, the transmitter first searches for the highly-likely match(es) according to the highly-likely message format. Only when the transmitter fails to find such highly-likely match(es) will it search for the guaranteed match(es) according to the message format associated with the guaranteed match(es). The additional highly-likely message formats compress more bits from the matched MSBs thereby allowing more bits for the total QPID length and further reducing the false wake-up rate.

Figure 6:
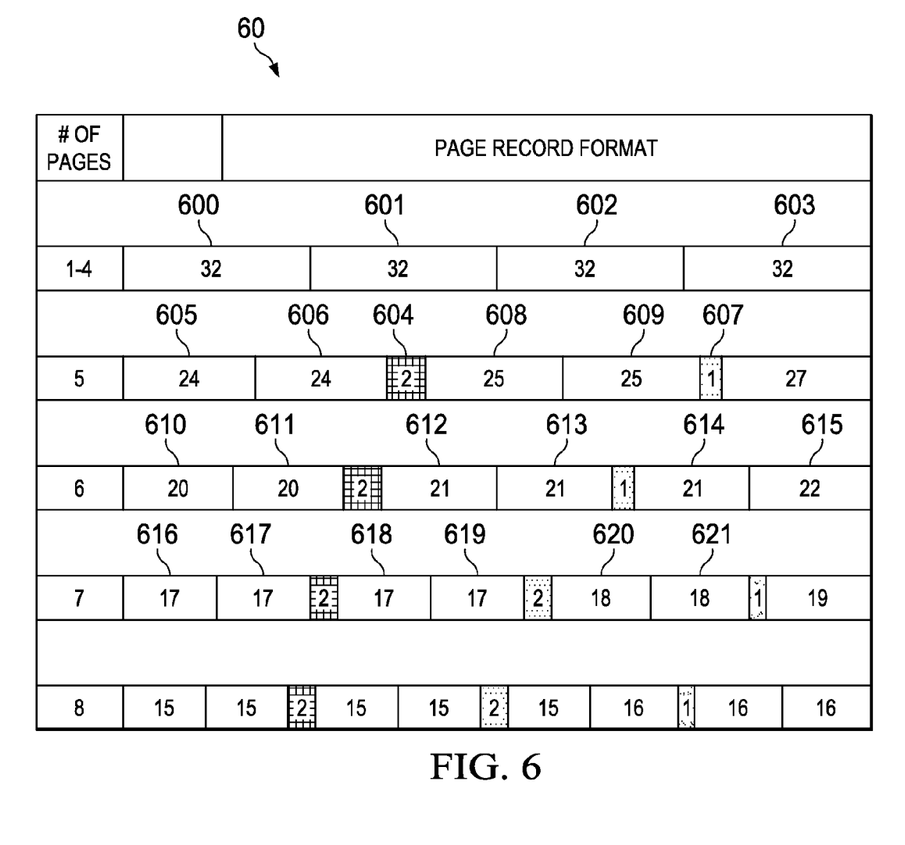
FIG. 6 illustrates an exemplary embodiment of an improved method for sending the regular paging messages according to the present invention.

FIG. 6 illustrated the exemplary embodiment of an improved method for sending regular paging message 60 according to yet another embodiment of the present invention. A page record is used to address multiple ATs via a single regular paging message. The header of the page record indicates how many ATs are being paged by regular paging message 60. Based on the number of paged ATs, the 128-bit page record is divided into four or more fields. The number in each of those fields indicates the number of bits in the corresponding field. When paging one to four ATs, up to four 32-bit access terminal identifier (ATI) addresses 600-603 can be included in the record. When paging more than four ATs, partial addresses are used. In the following sections, certain numbers of the least significant bits (LSBs) of the AT's session seed are used as the partial address in regular paging message 60.

It should be noted that it is possible to use the other numbers associated with the AT as the partial address, for example, certain numbers of the MSBs of the AT's session seed, certain numbers of the MSBs or the LSBs of a hashed number with the AT's unicast ATI (UATI), Electronic Serial Number (ESN), MIN (Mobile Identification Number), or International Mobile Station Identification (IMSI), and the like. It is preferred to use the LSBs of the AT's session seed as the partial address in regular paging message 60 if the MSBs of the AT's session seed is used as the QPID in quick paging message 30 (FIG. 3), or to use the MSBs of the AT's session seed as the partial address in regular paging message 60 if the LSBs of the AT's session seed is used as the QPID in quick paging message 30 (FIG. 3).

When paging five ATs, it is guaranteed that at least two out of five ATs' session seeds have the same last two LSBs, and among the remaining three ATs, it also is guaranteed that at least two ATs' session seeds have the same last LSB. Therefore, for the two ATs that share the same last two LSBs, the two common last two LSBs are compressed into one 2-bit field 604, which is proceeded by two associated partial address fields 605-606, each representing the 26th last to 3rd last LSBs (24 bits) of those two ATs' session seeds, respectively. For the two ATs that share the same last LSB, the two common last LSBs are compressed into one 1-bit field 607, which is proceeded by two associated partial address fields 608-609, each representing the 26th last to the second last LSBs (25 bits) of those two ATs' session seeds, respectively.

It should be noted that the location of the common bits field as shown in FIG. 6 is preferred for the case where the LSBs of session seeds are used. Similar to the method for sending the quick paging message, other arrangements of the location of the common bits field are possible.

The transmitter first determines the number N of paged ATs in the regular paging message. Then, based on the number N of paged ATs, the transmitter selects the page record format. The transmitter then searches for the minimal matches and determines the number of matched bits for each match given N paged ATs, using the same method as illustrated in FIG. 4. The transmitter then puts the LSBs of the paged ATs' session seeds according to the result of the search and the selected page record format.

After decoding the regular paging message correctly, i.e., the cyclic redundancy check (CRC) checks, the receiver reads the page record header first. Based on the header, the receiver then selects the corresponding page record format and decompresses the partial address fields, if necessary, to reconstruct all the address fields. Next, the receiver compares each address with the LSBs of its session seed. If there is a match, the AT is being paged and the AT will send an access probe to respond to the paging. If there is no match, the AT is not being paged and the idle AT can return to power saving mode until the next quick paging message.

Similar to the method for sending the quick paging message disclosed in the present invention, in addition to the compression shown in FIG. 6, additional bits can be embedded in and extracted from the comparison between each pair of the remaining partial addresses that are not compressed further. Therefore, for the example shown in FIG. 6, when paging five ATs, two additional order bits can be embedded in and extracted from the comparison between first and second 24-bit fields 605-606, and the comparison between first and second 25-bit fields 608-609, respectively.

When paging six ATs, three additional order bits can be embedded in and extracted from the comparison between first and second 20-bit fields 610-611, the comparison between first and second 21-bit fields 612-613, and the comparison between third 21-bit field 614 and the last 21 bits of 22-bit field 615, respectively.

When paging seven ATs, three additional order bits can be embedded in and extracted from the comparison between first and second 17-bit fields 616-617, the comparison between third and fourth 17-bit fields 618-619, and the comparison between first and second 18-bit fields 620-621, respectively. Furthermore, one more order bit can be embedded in and extracted from the comparison of the larger one of first and second 17-bit fields 616-617 with the larger one of third and fourth 17-bit fields 618-619, according to the page record format corresponding to the case of seven paged ATs. It is also possible to embed or extract this one extra order bit using the comparison of the smaller one of first and second 17-bit fields 616-617 with the smaller one of third and fourth 17-bit fields 618-619, according to the page record format corresponding to the case of seven paged ATs. When paging eight ATs, five order bits can be obtained using the same method.

The ordering bits are evenly distributed among the paged ATs to increase the effective length of each AT's address to roughly the same length. Therefore, the false addressing rate can be reduced. The Table below shows the false addressing rate using the existing method as illustrated in FIG. 2, and using the method of compression with and without the ordering bits, as disclosed in the present invention. The results show significant reduction in false address rate by using the method of compression with or without the ordering bits. However, the method of combining the compression and ordering bits provides an even larger reduction in the false addressing rate.

bers that happen to be the same, the receiver may ignore the ordering bit generated from the comparison of these two partial numbers.

In fact, the principle disclosed in the present invention applies to any signaling message or record that contains the same-type of field for multiple stations. The header in the message or record indicates the number of such same-type fields in the message or record. Based on this number and the principle that two out of any three binary numbers have 1 binary bit matched, two out of any five binary numbers have two binary bits matched (two out of the remaining three binary numbers also have one binary bit matched), two out of any nine binary numbers have three binary bits matched, and so on, the format of the message or record can be compressed without losing any information. After such compression, additional bits can be embedded in and extracted from the comparison between each pair of remaining partial numbers that are not compressed further. Using the compression method and embedding additional bits in the comparison between two partial numbers can help to either reduce the overall message overhead while keeping the same amount of information or actually increase the amount of information using the same amount of message overhead.

Figure 7:
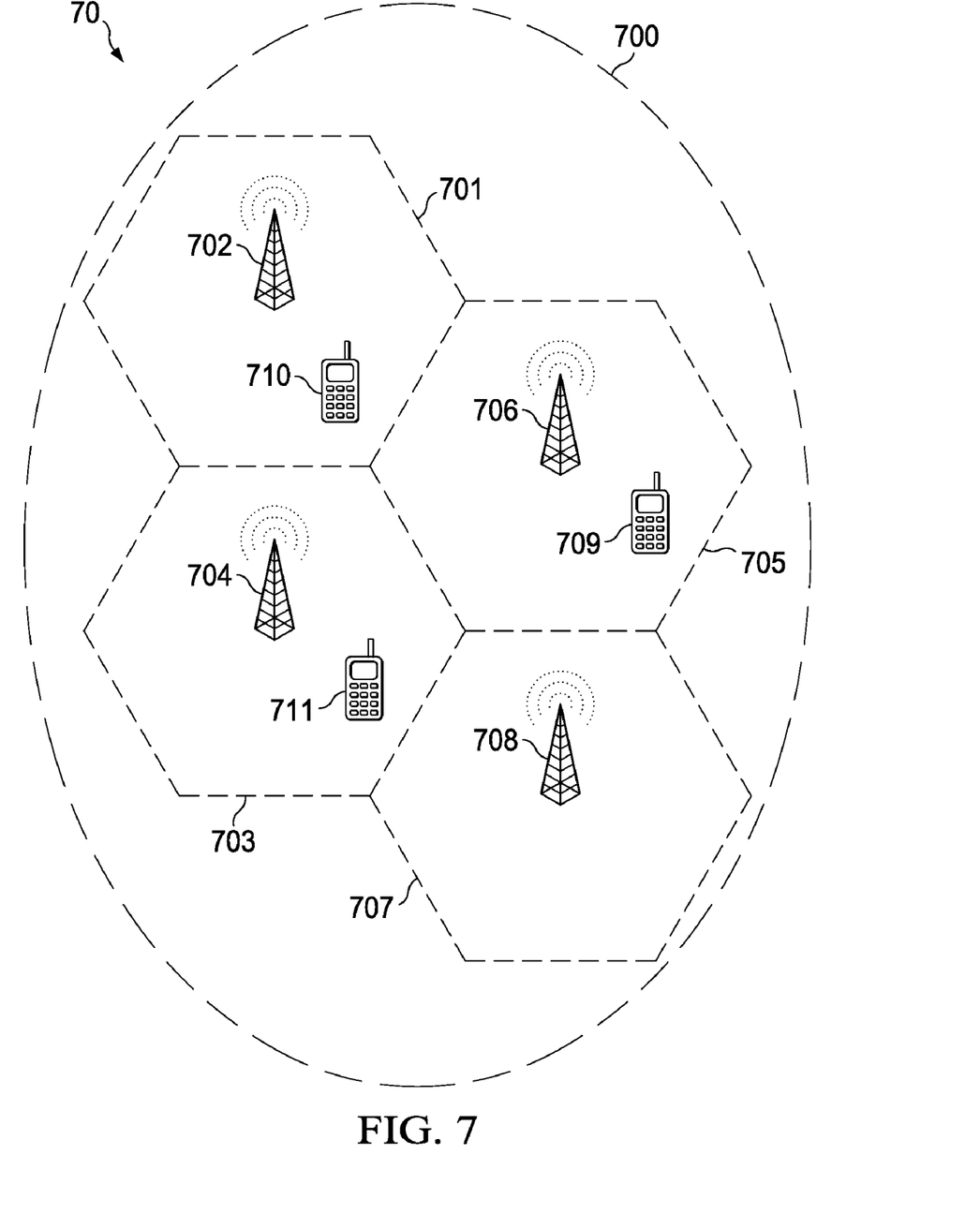
FIG. 7 illustrates a high-level system overview of a mobile network providing an environment for a communications system configured according to one embodiment of the present invention.

FIG. 7 is a block diagram illustrating region 700 of wireless network 70. A region 700 represents any service area and can be made up from any number of sub-regions, or sectors, each of which can further comprise at least one base station, e.g., tower, transmitter, or the like, from which a communications signal can be transmitted to provide service to the sector. For example, a sector 705 includes base station 706 that can transmit a signal to AT 709.

The principles and features of the various embodiments of the present invention are implemented through wireless network 70. The features and functionality for generating the page messages, determine the number of ATs to be paged, finding the matching bits, compressing the matching bits, and the like, are each handled at base stations, such as base stations 702, 704, 706, and 708, within sectors 701, 703, 705, and 707 of region 700. Computers and computer equipment at base stations 702, 704, 706, and 708 operate software that

TABLE

| Number of Pages | False Rate with Existing Method | False Rate with Compression but w/o Ordering Bits (% Reduction over Existing Method) | False Rate with Compression and Ordering Bits (% Reduction over Existing Method) |
|---|---|---|---|
| 5 | 1.04308E−07 | 6.70552E−08 (35.71%) | 5.21541E−08 (50%) |
| 6 | 2.38418E−06 | 1.66893E−06 (30%) | 1.19209E−06 (50%) |
| 7 | 2.2888E−05 | 1.33514E−05 (41.67%) | 9.5367E−06 (58.33%) |
| 8 | 0.000122064 | 8.39203E−05 (31.25%) | 5.34045E−05 (56.25%) |

According to yet another aspect of the present invention, the general rules for a method for distributing the ordering bits among the ATs being quick-paged or paged at the transmitter and the receiver may include that the ordering bits should be first given to the complete QPID (in the quick paging message case) or the complete address (in the regular paging message case) that has the shortest length, since they are the dominating factor of the false rate. Secondly, if the ordering bit that is generated from the comparison between two numbers is being given back to one of those two numbers, the ordering bit should either always be given to the smaller one of the two numbers or always be given to the larger one of the two numbers. The second rule may be defined by default standardization. Thirdly, when comparing two partial numcontrols the formation of the various waveforms for transmission over sector antenna for the ATs, such as ATs 709-711, which may comprise devices, such as mobile phones, wireless pagers, digital personal assistants (PDAs), or the like. This computer equipment includes and/or is connected to antenna controllers which control how the various waveforms and signals are transmitted over region 700.

The program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a read-only memory (ROM), a flash memory, an erasable ROM (EROM), a floppy diskette, a compact disk (CD-ROM), an optical disk, a hard disk, a fiber optic medium, a radio frequency (RF) link, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 8:
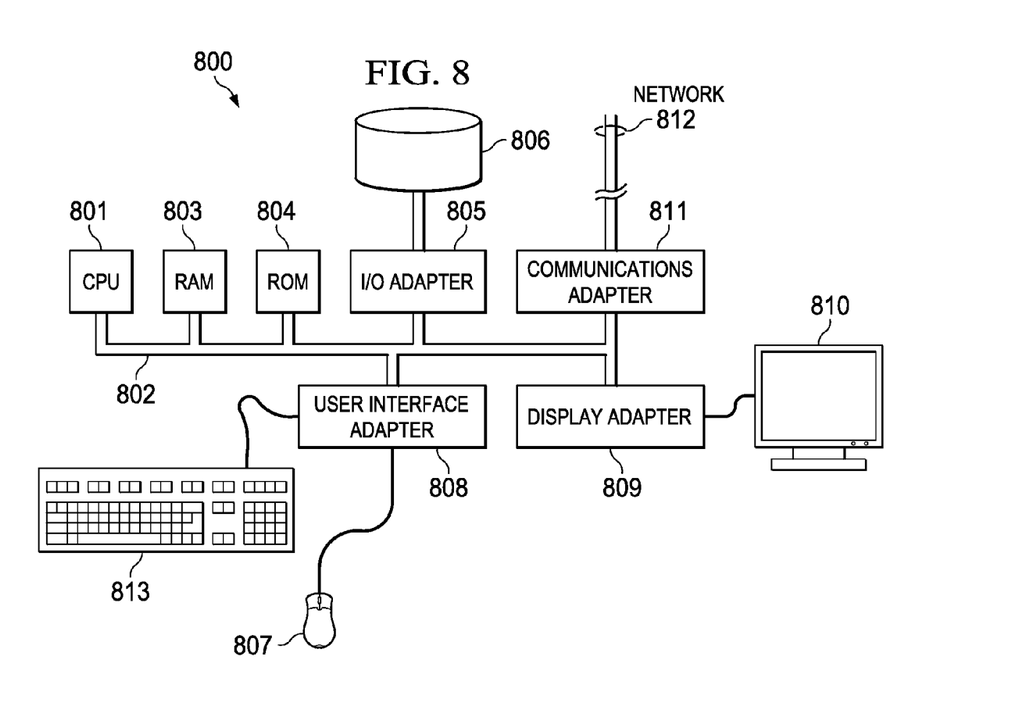
FIG. 8 illustrates a computer system configured to operate according to one embodiment of the present invention.

FIG. 8 illustrates computer system 800 adapted to use embodiments of the present invention, e.g., storing and/or executing software associated with the embodiments. Central processing unit (CPU) 801 is coupled to system bus 802. The CPU 801 may be any general purpose CPU. However, embodiments of the present invention are not restricted by the architecture of CPU 801 as long as CPU 801 supports the inventive operations as described herein. Bus 802 is coupled to random access memory (RAM) 803, which may be SRAM, DRAM, or SDRAM. ROM 804 is also coupled to bus 802, which may be PROM, EPROM, or EEPROM. RAM 803 and ROM 804 hold user and system data and programs as is well known in the art.

Bus 802 is also coupled to input/output (I/O) adapter 805, communications adapter 811, user interface 808, and display card 809. The I/O adapter 805 connects storage devices 806, such as one or more of a hard drive, a CD drive, a floppy disk drive, a tape drive, to computer system 800. The I/O adapter 805 is also connected to a printer (not shown), which would allow the system to print paper copies of information such as documents, photographs, articles, and the like. Note that the printer may be a printer, e.g., dot matrix, laser, and the like, a fax machine, scanner, or a copier machine.

Obviously, numerous variations and modifications can be made without departing from the spirit of the present invention. Therefore, it should be clearly understood that the form of the present invention described above and shown in the figures of the accompanying drawing is illustrative only and is not intended to limit the scope of the present invention.

What is claimed is:

1. A method for paging access terminals (ATs) in a region of a wireless network, said method comprising:
    determining a number of ATs to be paged;
    selecting a message format based on said number;
    searching for all guaranteed matching bits in each identifier representing said ATs to be paged;
    compressing a matching portion of said identifier into a page message according to said selected message format;
    placing an unmatching portion of said identifier into said page message;
    placing each remaining said identifier without said matching portion into said page message; and
    transmitting said page message in said region.

2. The method of claim 1 wherein said page message is a regular page message and said identifier comprises an access terminal identifier (ATI).

3. The method of claim 2 wherein said ATI comprises one or more of:
    a certain number of least significant bits (LSBs) of a session seed of said AT;
    a certain count of most significant bits (MSBs) of said session seed;
    a certain quantity of significant bits of a hashed number of a unicast ATI;
    an electronic serial number (ESN);
    a mobile identification number (MIN);
    an international mobile station identification (IMSI); and
    any combination thereof.

4. The method of claim 1 wherein said page message is a quick page message and said identifier comprises a quick page identifier (QPID).

5. The method of claim 4 wherein said QPID comprises one or more of:
    a certain number of least significant bits (LSBs) of a session seed of said AT;
    a certain count of most significant bits (MSBs) of said session seed;
    a certain quantity of significant bits of a hashed number of a unicast ATI;
    an electronic serial number (ESN);
    a mobile identification number (MIN);
    an international mobile station identification (IMSI); and
    any combination thereof.

6. The method of claim 1 further comprising:
    receiving said page message at one of a plurality of ATs in said region;
    decoding said page message;
    reading a header of said page message;
    selecting a received message format responsive to said header;
    decompressing zero or more matching portions in said page message;
    combining said decompressed zero or more matching portions with zero or more unmatching portions in said page message to form a transmitted identifier;
    comparing said transmitted identifier with an AT identifier (ATI) of said one of said plurality of ATs; and
    responding to said page message at said one of said plurality of ATs responsive to finding a match.

7. The method of claim 6 further comprising:
    reducing power consumption at said one of said plurality of ATs responsive to finding no match.

8. The method of claim 1 further comprising:
    comparing at an access network (AN) one of:
        two of said unmatching portions; and
        two of said remaining said identifiers;
    generating one or more additional bits based on results of said comparing;
    embedding said one or more additional bits into said page message; and
    distributing said one or more additional bits evenly among entries in said page message corresponding to said ATs to be paged.

9. The method of claim 8 further comprising:
    receiving said page message at one of a plurality of ATs in said region;
    extracting said one or more additional bits by comparing one of:
        two of said unmatching portions; and
        two of said remaining said identifiers; and
    constructing a transmitted identifier including said extracted one or more additional bits.

10. A method for sending a quick page message to access terminals (ATs) in a region of a wireless network, said method comprising:
    determining a number of ATs to be paged;
    selecting a quick page message format based on said number;
    searching for all guaranteed matching bits in each quick page identifier (QPID) representing said ATs to be paged;

compressing a matching portion of said QPID into said quick page message according to said selected quick page message format;
placing an unmatching portion of said QPID into said quick page message;
placing each remaining said QPID without said matching portion into said quick page message; and
transmitting said quick page message in said region.

11. The method of claim 10 wherein said QPID comprises one or more of:
a certain number of least significant bits (LSBs) of a session seed of said AT;
a certain count of most significant bits (MSBs) of said session seed;
a certain quantity of significant bits of a hashed number of a unicast AT identification (ATI);
an electronic serial number (ESN);
a mobile identification number (MIN);
an international mobile station identification (IMSI); and
any combination thereof.

12. The method of claim 10 further comprising:
receiving said quick page message at one of a plurality of ATs in said region;
decoding said quick page message;
reading a header of said quick page message;
selecting a received message format responsive to said header;
decompressing zero or more matching portions in said quick page message;
combining said decompressed zero or more matching portions with zero or more unmatching portions in said quick page message to form a transmitted identifier;
comparing said QPID with an AT QPID of said one of said plurality of ATs; and
monitoring a regular page channel for a next regular paging message responsive to finding a match.

13. The method of claim 12 further comprising:
reducing power consumption at said one of said plurality of ATs responsive to finding no match.

14. The method of claim 10 further comprising:
comparing at an access network (AN) one of:
two of said unmatching portions; and
two of said remaining said QPIDs;
generating one or more additional bits based on results of said comparing; embedding said one or more additional bits into said quick page message; and
distributing said one or more additional bits evenly among entries in said quick page message corresponding to said ATs to be paged.

15. The method of claim 14 further comprising:
receiving said quick page message at one of a plurality of ATs in said region;
extracting said one or more additional bits by comparing one of:
two of said unmatching portions; and
two of said remaining said QPIDs; and
constructing a transmitted QPID including said extracted one or more additional bits.

16. A method for sending a regular page message to access terminals (ATs) in a region of a wireless network, said method comprising:
determining a number of ATs to be paged;
selecting a regular page message format based on said number;
searching for all guaranteed matching bits in each AT identifier (ATI) representing said ATs to be paged;

compressing a matching portion of said ATI into said regular page message according to said selected regular page message format;
placing an unmatching portion of said ATI into said regular page message;
placing each remaining said ATI without said matching portion into said regular page message; and
transmitting said regular page message in said region.

17. The method of claim 16 wherein said ATI comprises one or more of:
a certain number of least significant bits (LSBs) of a session seed of said AT;
a certain count of most significant bits (MSBs) of said session seed;
a certain quantity of significant bits of a hashed number of a unicast AT identification (ATI);
an electronic serial number (ESN);
a mobile identification number (MIN);
an international mobile station identification (IMSI); and
any combination thereof.

18. The method of claim 16 further comprising:
receiving said regular page message at one of a plurality of ATs in said region;
decoding said regular page message;
reading a header of said regular page message;
selecting a received message format responsive to said header;
decompressing zero or more matching portions in said regular page message;
combining said decompressed zero or more matching portions with zero or more unmatching portions in said regular page message to form a transmitted ATI;
comparing said transmitted ATI with an AT ATI of said one of said plurality of ATs; and
sending an access probe to respond to said regular page message responsive to finding a match.

19. The method of claim 18 further comprising:
reducing power consumption at said one of said plurality of ATs responsive to finding no match.

20. The method of claim 16 further comprising:
comparing at an access network (AN) one of:
two of said unmatching portions; and
two of said remaining said ATIs;
generating one or more additional bits based on results of said comparing;
embedding said one or more additional bits into said regular page message; and
distributing said one or more additional bits evenly among entries in said regular page message corresponding to said ATs to be paged.

21. The method of claim 20 further comprising:
receiving said quick page message at one of a plurality of ATs in said region;
extracting said one or more additional bits by comparing one of:
two of said unmatching portions; and
two of said remaining said ATIs; and
constructing a transmitted ATI including said extracted one or more additional bits.

22. A computer program product having a computer readable medium with computer program logic recorded thereon, said computer program product comprising:
code for determining a number of access terminals (ATs) to be paged in a region of a wireless network;
code for selecting a message format based on said number;
code for searching for all guaranteed matching bits in each identifier representing said ATs to be paged;

code for compressing a matching portion of said identifier into a page message according to said selected message format;

code for placing an unmatching portion of said identifier into said page message;

code for placing each remaining said identifier without said matching portion into said page message; and code for transmitting said page message in said region.

23. The computer program product of claim 22 wherein said page message is a regular page message and said identifier comprises an AT identifier (ATI).

24. The computer program product of claim 23 wherein said ATI comprises one or more of:

a certain number of least significant bits (LSBs) of a session seed of said AT;

a certain count of most significant bits (MSBs) of said session seed;

a certain quantity of significant bits of a hashed number of a unicast AT identification (ATI);

an electronic serial number (ESN);

a mobile identification number (MIN);

an international mobile station identification (IMSI); and any combination thereof.

25. The computer program product of claim 22 wherein said page message is a quick page message and said identifier comprises a quick page identifier (QPID).

26. The computer program product of claim 25 wherein said QPID comprises one or more of:

a certain number of least significant bits (LSBs) of a session seed of said AT;

a certain count of most significant bits (MSBs) of said session seed;

a certain quantity of significant bits of a hashed number of a unicast ATI;

an electronic serial number (ESN);

a mobile identification number (MIN);

an international mobile station identification (IMSI); and any combination thereof.

27. The computer program product of claim 22 further comprising:

code for receiving said page message at one of a plurality of ATs in said region;

code for decoding said page message;

code for reading a header of said page message;

code for selecting a received message format responsive to said header;

code for decompressing zero or more matching portions in said page message;

code for combining said decompressed zero or more matching portions with zero or more unmatching portions in said page message to form a transmitted identifier;

code for comparing said transmitted identifier with an AT identifier (ATI) of said one of said plurality of ATs; and code for responding to said page message at said one of said plurality of ATs responsive to finding a match.

28. The computer program product of claim 27 further comprising:

code for reducing power consumption at said one of said plurality of ATs responsive to finding no match.

29. The computer program product of claim 22 further comprising:

code for comparing at an access network (AN) one of:

two of said unmatching portions; and two of said remaining said identifiers;

code for generating one or more additional bits based on results of said code for comparing;

code for embedding said one or more additional bits into said page message; and code for distributing said one or more additional bits evenly among entries in said page message corresponding to said ATs to be paged.

30. The computer program product of claim 29 further comprising:

code for receiving said page message at one of a plurality of ATs in said region;

code for extracting said one or more additional bits by comparing one of:

two of said unmatching portions; and two of said remaining said identifiers; and code for constructing a transmitted identifier including said extracted one or more additional bits.

* * * * *